(12) United States Patent
Aasen et al.

(10) Patent No.: US 9,152,739 B2
(45) Date of Patent: Oct. 6, 2015

(54) METHOD AND APPARATUS FOR PUSHING SITUATIONALLY RELEVANT DATA

(75) Inventors: Michael Aasen, Kanata (CA); Jordan Parsons, Kanata (CA); Sina Eizadshenass, Kanata (CA); Andrew Fisher, Ottawa (CA)

(73) Assignee: NTEROP Corporation, Kanata, Ontario (CA)

( * ) Notice: Subject to any disclaimer, the term of this patent is extended or adjusted under 35 U.S.C. 154(b) by 158 days.

(21) Appl. No.: 13/439,117

(22) Filed: Apr. 4, 2012

(65) Prior Publication Data

US 2012/0259852 A1 Oct. 11, 2012

Related U.S. Application Data

(60) Provisional application No. 61/472,418, filed on Apr. 6, 2011.

(51) Int. Cl.
*G06F 17/30* (2006.01)
*G06Q 30/02* (2012.01)

(52) U.S. Cl.
CPC .... *G06F 17/30997* (2013.01); *G06F 17/30867* (2013.01); *G06Q 30/0251* (2013.01)

(58) Field of Classification Search
USPC ........................................................ 707/737
See application file for complete search history.

(56) References Cited

U.S. PATENT DOCUMENTS

| 7,073,129 | B1 * | 7/2006 | Robarts et al. ................ 715/740 |
| 7,139,757 | B1 * | 11/2006 | Apollonsky et al. ................... 1/1 |
| 8,458,062 | B2 * | 6/2013 | Dutt et al. ........................ 705/35 |
| 2008/0114829 | A1 * | 5/2008 | Button et al. ................. 709/203 |
| 2008/0320036 | A1 * | 12/2008 | Winter ....................... 707/103 R |
| 2011/0022590 | A1 * | 1/2011 | Yu ................................. 707/728 |
| 2011/0162034 | A1 * | 6/2011 | Nagaratnam et al. ............. 726/1 |

OTHER PUBLICATIONS

Baddeley et al. "From Desktop to Field: Deploying visual Incident Analysis for Law Enforcement", Copy Right 2008 IEEE.*
http://www.zdnetasia.com/uk-police-enlists-artificial-intelligence-in-fight-against-crime-62048038.htm, UK Police Enlists Artificial Inteligence in Fight Against Crime, Nick Heath, Silicon.com, Nov. 6, 2008.
http://www.aaai.org/AITopics/pmwiki/pmwiki.php/AITopics/LawEnforcement, Law Enforcement & Public Safety, AAAI.

(Continued)

*Primary Examiner* — Apu Mofiz
*Assistant Examiner* — Cindy Nguyen
(74) *Attorney, Agent, or Firm* — Rosenberg, Klein & Lee (57) ABSTRACT

A computer-implemented method of providing users with contextually relevant data associates metadata tags with data items extracted from a variety of data sources that summarize the data items in searchable form using a common format. Contextual data is collected from the users indicative of their current situation. This data is then correlated with the metadata tags to identify data items of potential interest to the users taking into account their current situation. The identified data items are pushed to the relevant receiving devices in real time over a communications network to provide the identified users with information relevant to their current situation.

26 Claims, 8 Drawing Sheets

(56) References Cited

OTHER PUBLICATIONS http://www.telegraph.co.uk/news/uknews/6210255/EU-funding-Orwellian-artficial-intelligence-plan-to-monitor-public-for-abnormal-behaviour.html, The Telegraph, EU Funding 'Orwellian' Artificial Intelligence Plan to Monitor Public for "Abnormal Behaviour", Ian Johnston, Sep. 19, 2009.

http://tpdinternet.tucsonaz.gov/Organization/units/technology_initiatives.htm, Technology Initiatives, Tucson Arizona Police.

http://www.i2group.com/us/products-services/coplink-product-line, IBM i2 COPLINK Accelerating Law Enforcement, IBM Software.

http://homelandsecuritynewswire.com/app-developed-find-crooks, Homeland Security News Wire, App Developed to Find Crooks, Oct. 19, 2010.

http://en.wikipedia.org/wiki/intelligence-led_policing, Wikipedia, Intelligence-led Policing.

http://www.springerlink.com/content/5atdd4kq2g2agrxp/fulltext.pdf, COPLINK Agent: An Architecture for Information Monitoring and Sharing in Law Enforcement, Daniel Zeng et al., Department of Management Systems, University of Arizona, Tucson, AZ, 85721, pp. 281-295.

* cited by examiner

METHOD AND APPARATUS FOR PUSHING SITUATIONALLY RELEVANT DATA

CROSS REFERENCE TO RELATED APPLICATION

This application claims the benefit of U.S. provisional application No. 61/472,418, filed Apr. 6, 2011, the contents of which are herein incorporated by reference.

FIELD OF THE INVENTION

This invention relates to the field of data communications, and in particular to a method and apparatus for pushing situationally relevant data to a user, for example, a police officer.

BACKGROUND OF THE INVENTION

In emergency services, access to the right information at the right time is critical. In most cases, relevant information is scattered through old and new systems, some electronic and others based on paper. Emergency services workers can find themselves in many different situations that require totally different information, and many different situations can arise during just one shift. A lot of these situations carry a life or death implication. Police services are one area of emergency services that can act as an example of what exists today.

Police officers increasingly have to search through complex and extensive information and knowledge sources. To find information, police officers have to know where the data sources are located and how to access them. A large amount of manual and cognitive effort is required to query all the relevant data sources, each with a different search interface, or to read the paper-based reports and glean the correct and relevant information from them.

Database technologies have been widely used to manage crime and police reports to provide faster and easier access for law enforcement personnel. One such example is the COPLINK Connect system. COPLINK aims to enable law enforcement agencies to search for information more effectively by providing a user-friendly interface that integrates data from various sources such as incident records, mug shots, and gang information. COPLINK uses co-occurrence analysis to identify the relationships among different entities (e.g., persons, vehicles, locations, and organizations) in criminal justice databases.

Other information technologies also have been used in law enforcement. For example, the Connect system introduced by the New York Police Department uses computer statistics and crime mapping techniques to identify the types of crimes happening in different districts. Data mining techniques have also been applied to identifying interesting patterns in criminal data. For example, a self-organizing map is used to cluster similar sexual offense cases into groups in order to identify serial offenders.

There are many monitoring and notification systems for Web information sources. One example is the NorthernLight Web search engine (www.northernlight.com), which alerts users when new Web pages are added to the database. Some client-side search tools, such as Copernic Agent (www.copernic.com) and WebSeeker (www.bluesquirrel.com), also provide the functionality for scheduling automatic searches. Eirade (www.etrade.com) allows users to choose which stocks they want to monitor and the users are alerted when the stock price reaches the level they specified. In the financial application arena, more advanced monitoring (e.g., monitoring based on the results of complex financial analysis) has also been proposed. In these systems, users can often opt to be alerted in different ways, such as Web messages, emails, pagers, voice messages, or short messages for mobile devices. In the area of providing monitoring and alerting support for law enforcement applications, the FALCON system developed at Charlotte-Mecklenburg Police Department (CMPD) in Charlotte, N.C. offers the functionality of monitoring all incoming police records as well as sending alert messages to police offers by email and pager. FALCON does not offer collaborative filtering capabilities or advanced collaboration functions.

Collaborative filtering is a kind of collaboration in which people help one another perform filtering by recording their reactions to documents they read. Examples of collaborative filtering and recommender systems include Amazon.com, GroupLens, Fab, Ringo, Do-I-Care, and Collaborative Spider. When a user performs a search, these systems will recommend a set of documents or items that may be of interest based on this user's profile and other users' interests and past actions.

New technologies providing even more information are showing up all the time. An example is a device that shoots a small GPS-equipped dart that attaches itself to a suspect's vehicle during a high-speed pursuit. Another is an ear-mounted video camera that captures an officers' view of traffic stops and other incidents. Police departments are using cameras on patrol cars to scan and track the license plates of each vehicle they pass, which lets them recoup overdue parking violations fines.

Law enforcement technology may be evolving, but it hasn't changed the core responsibilities of police officers' jobs; police officers still must talk to people and gather information. Judgment and instinct from officers is the most important when recording what is actionable. When an officer is given information, they are responsible to act on it or not, which can lead to misconduct.

Two types of intelligence are used:
Tactical intelligence is used in the development of a criminal case that usually is a continuing criminal enterprise, a major multijurisdictional crime, or other form of complex criminal investigation, such as terrorism. It seeks to gather and manage diverse information to facilitate a successful prosecution of the intelligence target. It is also used for specific decision making or problem solving to deal with an immediate situation or crisis.
Strategic intelligence examines crime patterns and crime trends for management use in decision making, resource development, resource allocation, and policy planning. While similar to crime analysis, strategic intelligence typically focuses on specific crime types, such as criminal enterprises, drug traffickers, terrorists, or other forms of complex criminality. It also provides detailed information on a specified type of crime or criminality.

The different forms of intelligence can guide investigations, provide insights for resource allocation, suggest when priorities should be expanded or changed, suggest when new training and procedures may be needed to address changing threats and permit insight when there is a change in the threat level.

Intelligence-led policing (ILP) is a policing model that has emerged in recent years which is built around risk assessment and risk management. Although there is no universally accepted understanding of what intelligence-led policing entails, the leading definition is that ILP is a strategic, future-oriented and targeted approach to crime control, focusing upon the identification, analysis and 'management' of persisting and developing 'problems' or 'risks.' In simpler terms, it is a model of policing in which intelligence serves as a guide to operations, rather than the reverse.

Unlike industries where information overload can be resolved with hardware and storage policies, the emergency service field must account for a daily bombardment of information that might or might not be relevant the moment it is received. Zipping up this information and shipping it off to some forgotten archive is not an option, especially when considering that case activity is constantly in flux. It takes full time personnel and large/expensive meetings devoted to creating actionable information with no good way to disseminate it.

Intelligence data often resides across multiple locations, making retrieval and analysis even more cumbersome. At the end of the day, analysts require speed, efficiency and 100-percent accuracy when it comes to the software tools they use to carry out their intelligence work. The information should be kept permanently and be stored in doubles or triples.

There are four key needs in emergency services:
Operational Awareness: Supporting a comprehensive, relevant view into activities
Information Integration and Analysis: managing data effectively and reducing information overload
Strategic and Tactical Planning: creating more opportunities for proactive policing through analytic tools
Field Mobility: providing a platform for data and information exchange into and out of the field It is also important that these follow standard operating procedures.

Increasing numbers of emergency service workers are using sophisticated hardware, including smart phones and smart devices that plug into computers (for example fingerprint analyzers) and radios. Because of the range in age of workers, the equipment has to be easy to use and learn. With unlimited mobile data on tap, all manner of information can be pushed to workers who might previously have had to spend time returning to the station to receive it. It also serves as a quick storage medium for things like photos of suspects, or new methods of performing a procedure.

The use of mobile technology is associated with an increasing amount of information at the users disposal. The twin themes of a growing volume of information and increasing exposure to it is called information overload. Information overload results from the inability of living systems to process excessive amounts of information. Combined with the fact that technology can generate information much faster than people can process it, this means that people often find themselves unable to cope with an increasing amount of information. Information overload may originate from information actively requested or searched for and information received whether or not the recipient wants/needs it or not.

In emergency service organizations, a great deal of information flows to and from internal departments and external organizations, and the regulatory framework requires substantial audit trails and documentation. The structure is one of command and control, with hierarchical relationships involving reporting up and down the ranks. These factors (and others) result in a large volume of information for managers to deal with.

Organizational information includes systems and services that are designed to acquire, share and disseminate information of all kinds, including information that circulates through formal and informal means, both internally and externally. The information environment and organizational context needs to be understood in order to understand the complex ways in which information flows in, out and around the organization, and how this contributes towards information overload, and to judge the effectiveness of the information, style, etc.

Emergency service organizations operate in a complex and changing environment, with information flowing to and from external organizations, as well as through a number of internal hierarchies and departments. The highly structured organization tends to generate highly structured and often large amounts of information. Time pressure, frequent deadlines, complex tasks, high uncertainty, unpredictable events and important decision consequences also contribute towards information load.

As the culture of an organization moves towards a more open information environment, with information being shared more freely and widely, this results in a greater volume of information being made available to the individual, and decision making power being pushed out. Superiors can try to summarize information on their behalf. This serves to moderate information overload by reducing the time spent on information seeking or filtering. To avoid information overload, individuals employ process or coping strategies, which may be either conscious or unconscious and can potentially become dysfunctional. Filtering, omission and error are among the coping strategies.

Effective real-time business intelligence requires that data latency, analysis latency, and action latency be reduced as much as possible. The analysis of large amounts of historical data prior to taking action inherently involves considerable latency.

Among the problems experienced by emergency workers are the following:
Too much information
Lack ability to present information relevant to each workers needs to their current context
Information and knowledge management
Integration of multiple systems, each having different functionalities and ontology's and data fragmented with lack of interoperability between systems, internal groups and departments
Expecting workers to query different distributed data sources, including both internal databases as well as external ones managed by other agencies, often using different hardware platforms, database systems, network protocols, data schemes, ontology's and user interfaces
Rapid and continuing advancement of information technologies
Data is sent in different ways: radio, email, dispatch, etc.
Data is input into the different systems by different people in different ways
The dynamic nature of data sources; for example in police services, many cases involve long periods of investigation, and the data can be updated frequently
Personnel with different job functions and working at different locations can easily acquire a vast amount of knowledge about a particular topic; the ability to share knowledge in a collaborative environment by linking together people who are working on the same or similar cases
No automatic information monitoring or information sharing among users
Having situational awareness, and once a worker has it for their area, there is no way to pass it on
Not leveraging full power of Next Gen Mobility devices
Daily briefings are largely a manual process and are very static, there is no tracking of what is shared and no standard notation between presenters Collaboration & Communication take place over traditional channels—often inefficient New technologies emerging that have new interfaces and provide even more information that needs to be integrated and filtered In general, information stored or gathered is easy to report or track, but when, who, and how they accessed is not.

Old information needs to be purged.

SUMMARY OF THE INVENTION

According to the present invention there is provided a computer-implemented method of providing users with contextually relevant data, comprising associating metadata tags with data items extracted from a variety of data sources that summarize the data items in searchable form using a common format; collecting contextual data for users indicative of their current situation; correlating the contextual data with said metadata tags with to identify data items of potential interest to the users taking into account their current situation; identifying relevant receiving devices associated the identified users; and pushing the identified data items to the relevant receiving devices in real time over a communications network to provide the identified users with information relevant to their current situation.

With the context of the invention, a metadata tag, or metatag, is information that is used to organize and categorize the underlying data. Examples might be location, time, groups, skills, channel, users etc. Contextual data represent qualities associated with the data and can be stored as metatags.

The contextual data can, for example, be a subscription to a channel. The metadata tag on a data item can be geographical location, the time when it occurred in the form of a timestamp, the nature of a particular task, or a channel topic.

The data items may be ranked in order of interest. The ranking can be customer based and influenced by user feedback. The rankings may be based on weight vectors, which are changed based on the customer feedback.

The invention also provides a system for providing users with contextually relevant data, comprising a data store for storing metadata tags with data items extracted from a variety of data sources that summarize the data items in searchable form using a common format; and processor configured to collect contextual data for the users indicative of their current situation; correlate said contextual data with said metadata tags with to identify data items of potential interest to the users taking into account their current situation; identify relevant receiving devices associated with the identified users; and push the identified data items to relevant receiving devices associated with the respective users in real time over a communications network to provide the users with information relevant to their current situation.

The system provides a way to define channels to broadcast information on. As is the case for users, these channels would have relevant information on a particular topic. The same mechanism for determining relevance on a data item for a user can be used to determine the relevance of a data item for a channel. Data items can also be manually added to a channel. When a user subscribes to a channel, a secondary filtering action can be performed so that they only see data from the channel that is relevant to them if that is what they want.

Embodiments of the invention provide a platform and application suite that addresses critical information management needs. The platform connects all the different information sources that a worker might needs, analyses the data, and then, based on the workers contextual parameters (training, location, current situation, etc.), gives them the required information in the best way possible (on the right communication device of which there could be many). The platform adds a layer of collaboration and situational awareness to current information systems. The platform is capable of integrating with various data sources and is built to allow for easy integration of applications.

The platform also includes applications that can be used to input information, for example a briefing creation and presentation tool, and several intuitive interfaces to allow workers to access the system. Information can be added to the system through users or systems as authorized. Through a simple and efficient interface, briefings can be created to include authorizing capabilities and information being pushed can be updated throughout the day. Briefings are therefore easy to present in a continuous manner, throughout a worker's shift. This moves the briefing from a static, one-time event, to an ongoing and constantly updated process.

Users can then access the system through a personalized application. This application is available on a wide variety of devices including on a computer through a web browser or with a smart phone client The information provided through these clients (either 'pushed' to them, or asked for by them) is presented in a relevant and prioritized manner, dependant on individual and situational circumstances. Information presented is customized to each user based on their current context and needs. The user can also give input as to the relevance of the information they received at the time, so the system can learn to make better decisions.

The system can also group users together that have a connected context, for example a "Case" where different individuals contribute, and need to be updated on relevant developments. The system also can merge data coming to a user for different reasons, and determine a combined ranking. For example, a Case can be an ongoing role for a user, which is applicable even if they are in another role (for example on patrol) at the same time.

The system thus provides a rule-based methodology for pushing relevant information to the appropriate user at the right time based on a predetermined set of rules.

The metatags may be a configurable parameter of the system as different users may have different needs. For example, the police service will have different criteria compared to the fire service.

The receiving devices could be radios, in-car terminals, computers (including wireless laptops, tablets, desktops etc.). They may be handheld, but do not need to be, as in the case of an in-car system. Conceivably they could also be wired in a situation where user are located at, or have access to, a fixed station. A receiving device may also include shared systems such as a TV that has a marquee to display various pieces of information important to a group of people.

There are many types of users who would be interested in the system, including firemen, paramedics, soldiers, or indeed anyone who has need of updated real-time information.

In one embodiment of the method, the information can be displayed by relevance and also overlaid over other information, such as a template or map. For example, in the case of a police officer, the display could include a flag at the location of a recent burglary with a call-out box noting the relevant details of the crime for that officer.

Embodiments of the invention may handle the process or workflow associated with all information that comes through this system. For instance, it may include a workflow editor that is graphical in nature and describes the process design surrounding how all information is handled for each type, for example, using a set of business rules, thus providing an easy method of not only configuring the exact process information follows while in the system but easily understanding it, documenting and maintaining it moving forward.

Embodiments of the invention may also include ad-hoc language translation. If Quebec sent high priority information to Ontario, the system could translate it in real time.

Aspects of the invention include separately and in combination:

Current systems do not 'push' the 'relevant' information to users in the right context; this one does.

Users are given mining tools, but they are not contextual; this system presents users with the information ranked according to the reason they are looking for it.

The system integrates the current location of a worker and uses it as an input.

The system assigns people with particular attributes and matches these with the current role they are in, and takes all the information available for that user in that role and through an algorithm, decides what information is relevant and in what order. It then looks at the devices that the user has available, and combined with the attributes of the device, pushes this data to one or more of the devices.

The system introduces new devices to push information to in a standard way.

The system allows for integration of legacy and new systems that provide information and translates the different ontology's into one cohesive one for all members.

Helps manage the information.

Links relevant groups of people and information together based on context.

Allows for automatic monitoring for relevant information

Implement standard operating procedures (SOP) around briefings.

Information given to users can change or be updated in real time—the user is informed as old data becomes updated with newer more relevant data.

Includes collaborative filtering done by users on info they receive and rank as to the usefulness, which is then fed back into the system, so it learns.

Does not replicate information stored in a legacy system, it contains metadata to be able to find the data from those systems.

Enforces a process for every situation, so for example, the creation of a briefing has standard inputs and outputs and framework so that it is repeatable. It also helps to lower the cases of misconduct, since the right information is given, and a standard procedure for the situation can be enforced.

A situation, with the information given, and the response of the worker can be recorded and then used later for debriefing, and packaged up to automatically create training exercises.

Ability to provide tracking and auditing of information for who read it, when they read it, and when it became available.

In general, embodiments of the invention provide that:
1. All information is secure and available as authorized from any location (smart phone, web, tablets, etc.)
2. Various systems are easy to add and integrate to the platform through APIs (record management system, computer aided dispatch, etc.)
3. Relevant and prioritized information is pushed to users based on their context using information such as location, skill set, functional groupings, level of access/rank, availability (proactive mode/general purpose, reactive mode/acute to exact location) etc. The weightings change along with their current situation.

BRIEF DESCRIPTION OF THE DRAWINGS

The invention will now be described in more detail, by way of example only, with reference to the accompanying drawings, in which.

DETAILED DESCRIPTION

Figure 1:
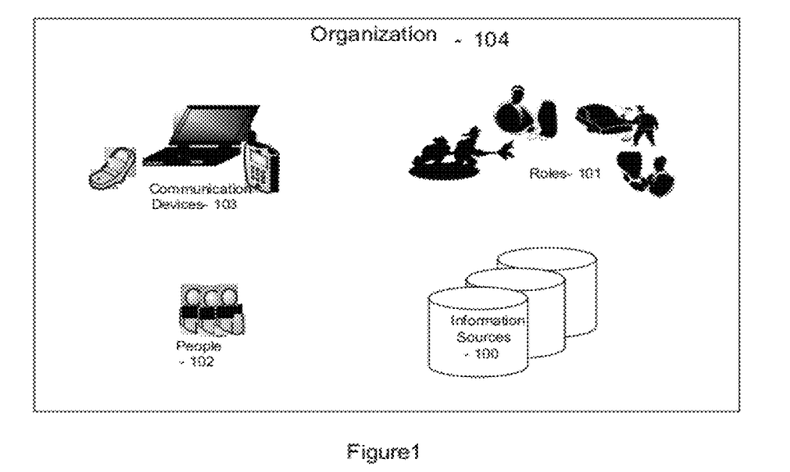
FIG. 1 is an organizational overview of an emergency service.

Referring now to FIG. 1, in an emergency services organization (104), there are many information sources (100), many people (102) who fill many different roles (101) which could include groupings, and who use many different communications devices (103) to collaborate and perform their duties. Embodiments of the invention connects all these various and disparate entities together into a cohesive system that decreases the amount of irrelevant information that an emergency services worker gets or has access to and enhances their access to relevant information, depending on various factors, the main one being the current situation they are in (which includes location).

Figure 2:
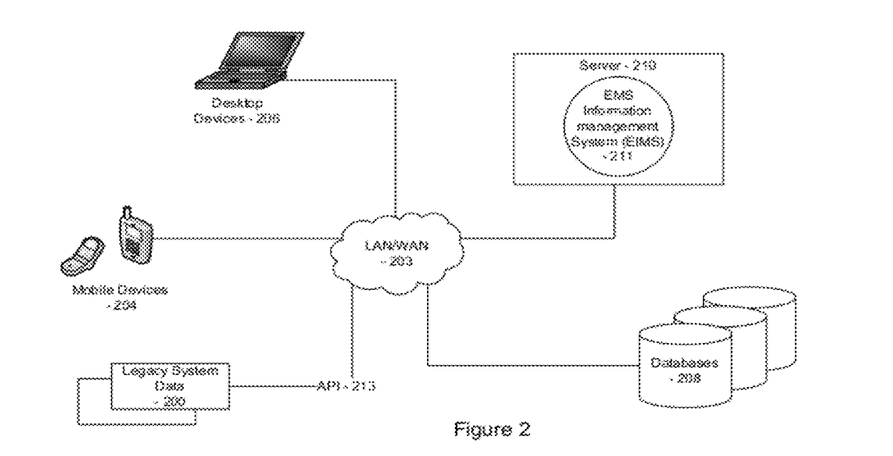
FIG. 2 shows the physical layout of an embodiment of the invention.

FIG. 2 shows the physical layout of the system. There are Legacy Systems that contain Data 200, which are connected to the LAN/WAN 203 in standard secure ways, and provide API's (Application Programming Interface) 213 to push or retrieve information from various sources. There is also a set of Mobile Devices 204 (smart phones, cell phones, tablets, etc.) that connect to the LAN/WAN 203 using standard secure wireless services. There are Desktop Devices 206 (PC's, tablets, phones, etc.) that are connected to the LAN/WAN 203 in standard ways. There are Databases 208 connected to the LAN/WAN 203, which store configuration data and standardized information, including Items and MetaData. There is a Server 210 that runs the EMS Information Management System (EIMS) 211 in accordance with an embodiment of the invention, which is connected to the LAN/WAN. This can be one server, or many servers distributed over the LAN/WAN 203.

Figure 3:
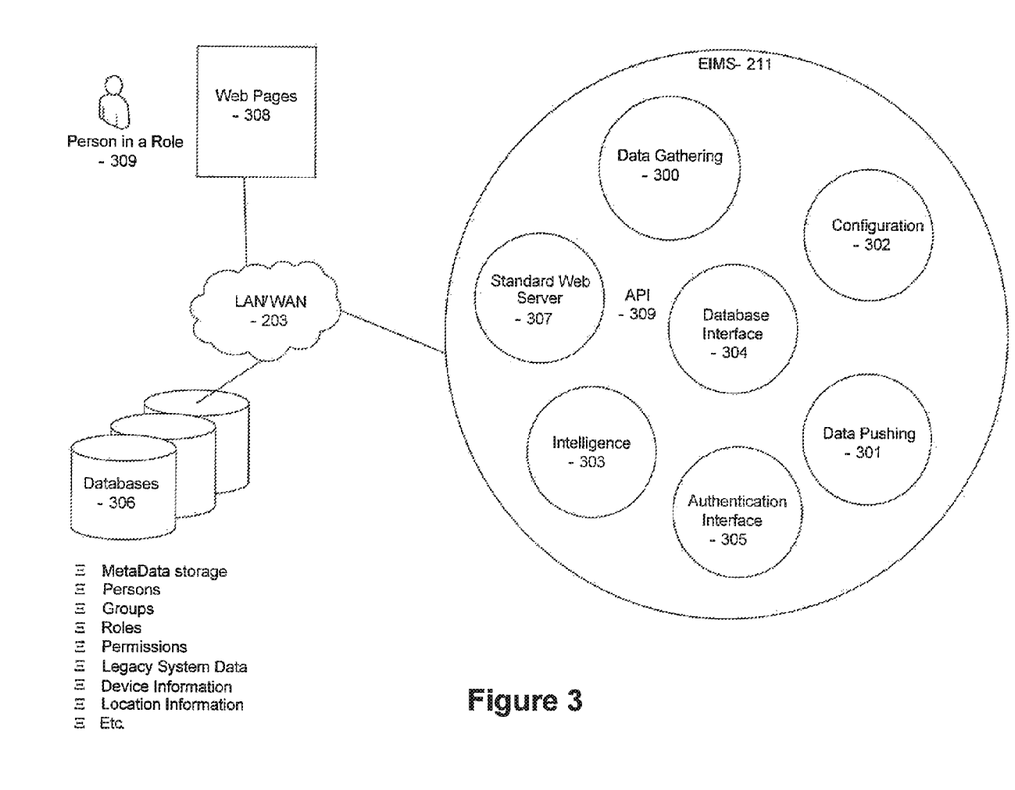
FIG. 3 is a high level view of software for implementing the invention.

FIG. 3 is a high level view of the EIMS software 211 that runs on Server 210. It is broken into parts, Data Gathering 300, Data Pushing 301, Configuration 302, Intelligence 303, Database Interface 304, Authentication Interface 305 and a Standard Web Server 307, which services Web Pages 308 used by a Person in a Role 309 connected via the LAn/WAN 203. Instead of a Web Page/Web Server, the system could also be implemented using a Native Client and Native Server Application. There is a standard API 309 that the Web Server or Native Server Application uses to interact with all the other components in the EIMS software 211. These are shown as all running on the same server, but each component can also reside on different servers spread out and communicating through an API to each other over the LAN/WAN 203. There are many Databases 306 that the Database Interface 304 interacts with. These are used for storage of: MetaData, Persons, Groups, Roles, permissions, Legacy System Data, Device Information, Location Information, etc. There are also links between relevant pieces of data.

Figure 4:
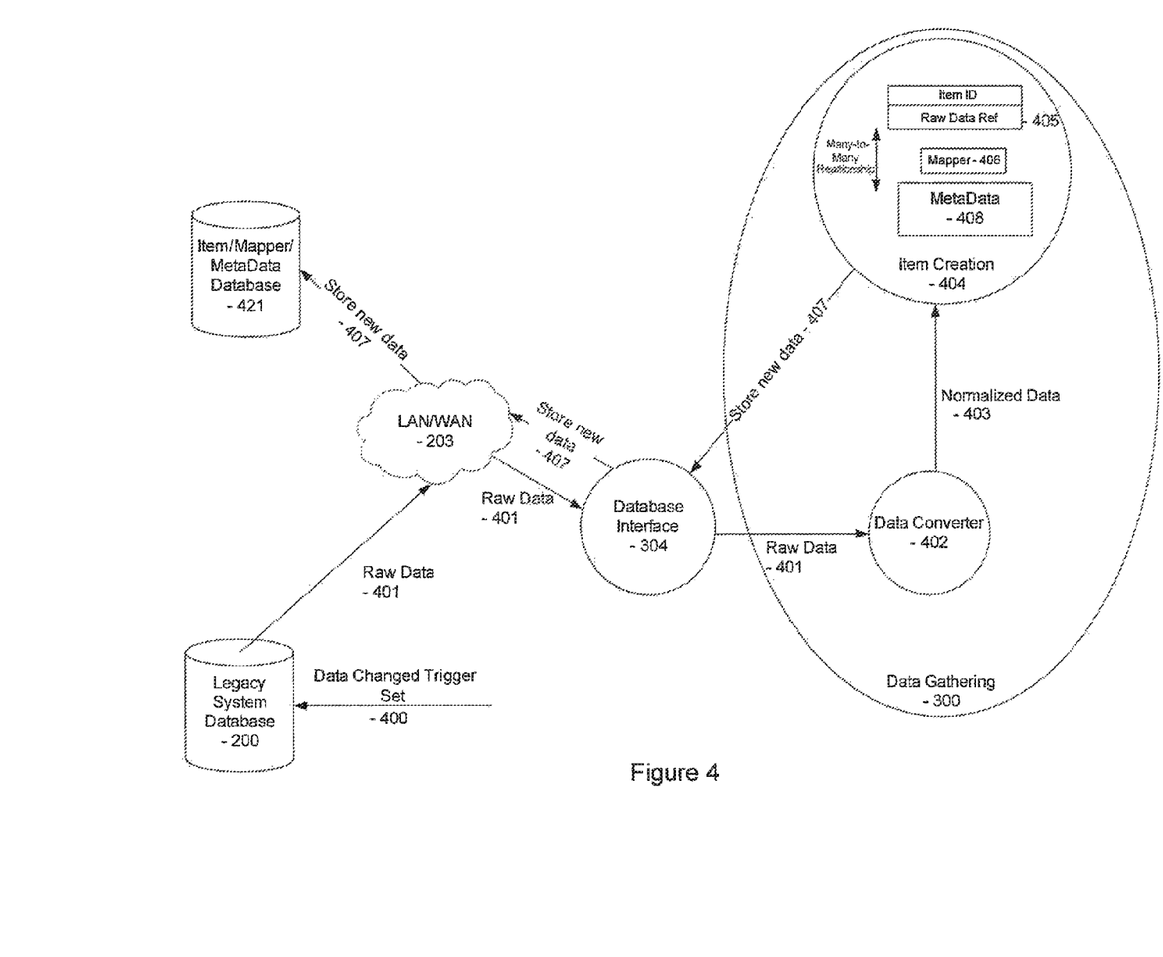
FIG. 4 is a detailed diagram of the Data Gathering 300 piece.

FIG. 4 is a detailed diagram of the Data Gathering 300 component. Legacy Systems 200 provide an API 400 of some sort that lets the user receive or query for data 401 and set triggers if data changes 400. If a trigger fires, then Raw Data 401 is sent via the LAN/WAN 203 to the Database Interface 304. It in turn passes it to the Data Converter 402, which is part of the Data Gathering system 300. The Data Converter 300 is responsible for taking the Raw Data 401, and normalizing it, or putting it into a standard format that the Item Creation software 404 can use. After it has normalized the data, it passes this data 403 to the Item Creation software 404. MetaData 408, which is created from the Raw Data 401, is categorized (an example of categories for a Police application would be: Be on the lookout, missing person, robbery). The Raw Data is given a Reference, and an Item ID is assigned so that the data does not have to be kept in the system, just a reference to it 405. A Mapper 406 maps the relationships between the MetaData 408 and the Items 405. There is a many-to-many relationship between the two. For example, if the Raw Data 401 contains a description of an incident at a particular location, then one item can be associated with different instances of MetaData. For example, the item could be associated with both time Metadata and location Metadata. In reverse, one instance of MetaData, for example location, i.e. zone/area, could be related to many different items. This new Data 405, 406, 408 is then stored 407 into the item/Mapper/MetaData Database 421.

Figure 5:
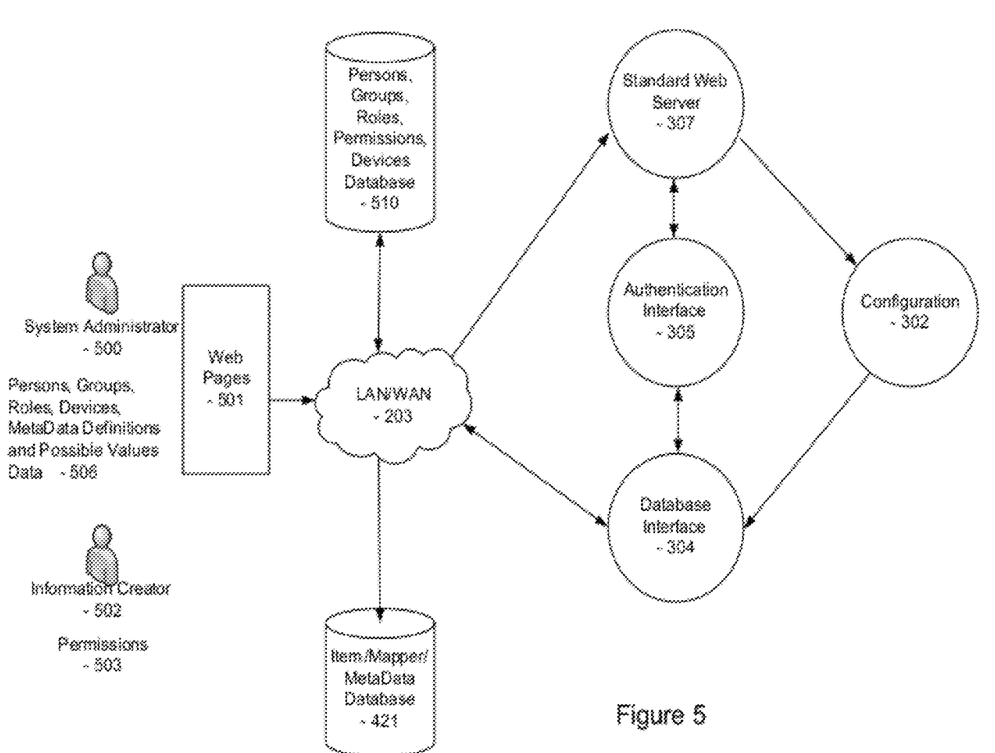
FIG. 5 illustrates a method of configuring the system.

Referring to FIG. 5, a System Administrator 500 uses Web Pages 501 to configure the system. There is also an Information Creator Role 502, which can assign Permissions on Items in the system and perform other tasks. This is all done using standard methods for inputting data on a web page and storing it a database. Typically, configuration consists of Persons, Groups, Roles, Devices, MetaData Definitions and Possible Values that can be assigned 506. Permissions 503 define who is allowed access to a specific piece of data (Items, MetaData). The Web Pages 501 are connected through the LAN/WAN 203 in a standard way using standard software to the Standard Web Server 307. When the System Administrator 500 wants to input data, they must first go through security. The Standard Web Server 307 uses the Authentication Interface 305 to check the credentials. The Authentication Interface 305 uses the Database Interface 304 to do this. This is all standard login procedure. The input Data 506 is formatted in the Standard Web Server 307 and passed Configuration 302. Configuration 302 uses the Database Interface 304 to store the data in the correct Database 510, 421. When an Information Creator 502 is assigning Permissions 503 to an Item, they can do so in two ways.

They can assign particular Persons, Roles or Groups Permissions, or they can choose a pre-defined default setting, which automatically makes the link between the Item and the Persons, Groups and/or Roles allowed to access it. These links between Persons, Roles, Groups and Items are stored as Permissions 503.

Figure 6:
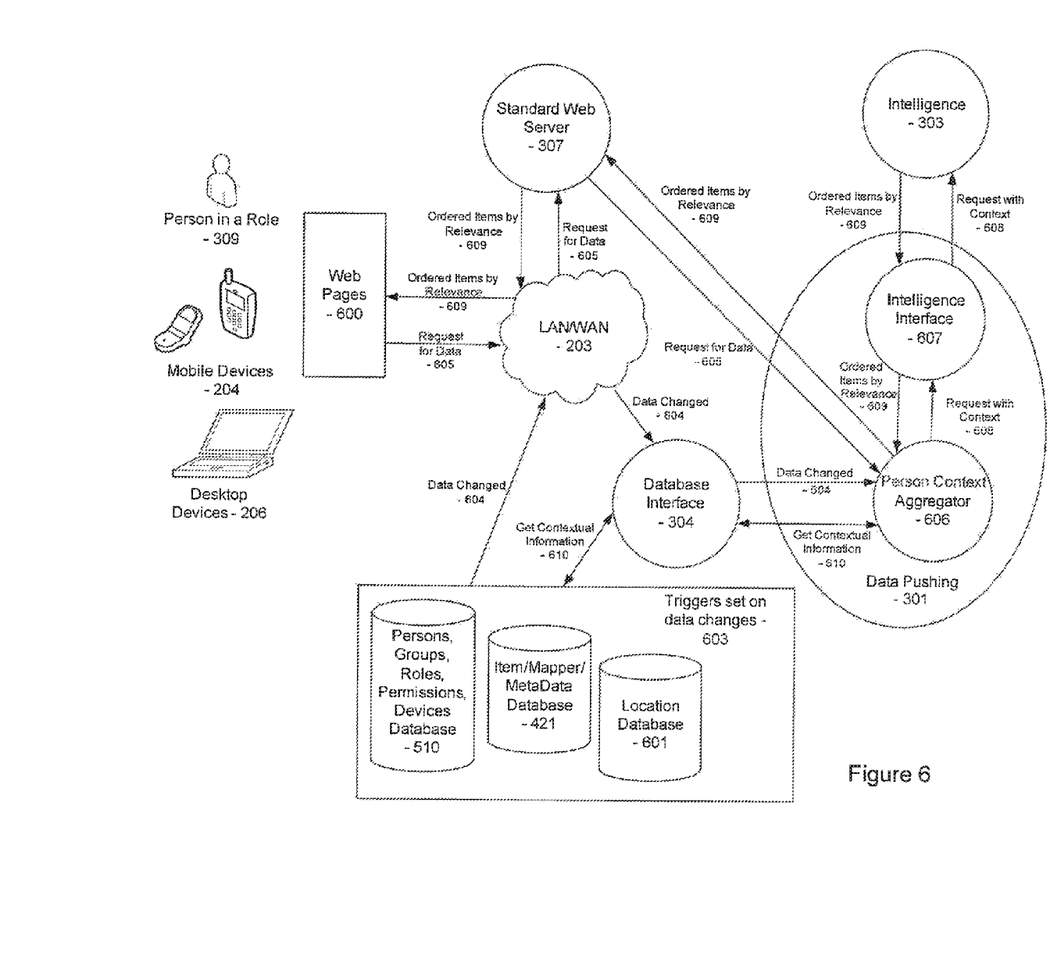
FIG. 6 shows how data can be pushed to a device.

FIG. 6 is a breakdown of how relevant contextual data is pushed to a Person in a Role 309 using the Data Pushing software 301. Data can be pushed to a device, either automatically by the system when a Trigger 603 fires, or on Request for Data 605 from a Person in a Role 309 using either a Mobile Device 204, or a Desktop Device 206. If a Trigger 603 fires, then a Data Changed message 604 is sent to the Person Context Aggregator 606 through the LAN/WAN 203 and the Database Interface 304. In this case, the Person Context Aggregator 606 is responsible for Getting Contextual Information 610 for every Person associated with the changed data. It is only relevant if a person is connected to the system, which is taken into consideration via context. If a Person in a Role 309 uses Web pages 600 a Request for Data 605 is sent to the Person Information Aggregator 606 through the LAN/WAN 203 and the Standard Web Server 307. The Data Pushing software 301 is responsible for pushing Ordered Items by Relevance 609 to a Person in a Role 309 appropriately configured for the type of Device 204, 206 the Person is using. The Person Context Aggregator on receipt of either a Request for Data 605, or a Data Changed 604 message then determines the Person or Persons that needs to be updated and using the Database Interface 304 to get Contextual Information 610 from the various Databases 510, 421 and 601. The Location Database 601 has the Location of the Person. When the Person Context Aggregator 606 has all the contextual information, for each person involved, it passes a Request with Context 608 to the Intelligence Interface 607, which queries the Intelligence software 303. The Intelligence software 303 sends back a list of Ordered Items by Relevance 609 for a particular person, which is passed to the Person Context Aggregator 606, and then to the Standard Web Server 307, and pushed out to the correct Person in a Role 309 through their Web Pages 600, formatted correctly for the Device 204, 206 that they are using. The Person Context Aggregator does this for each Person in a Role 309 who is affected by the change in data or makes a'request.

Figure 7:
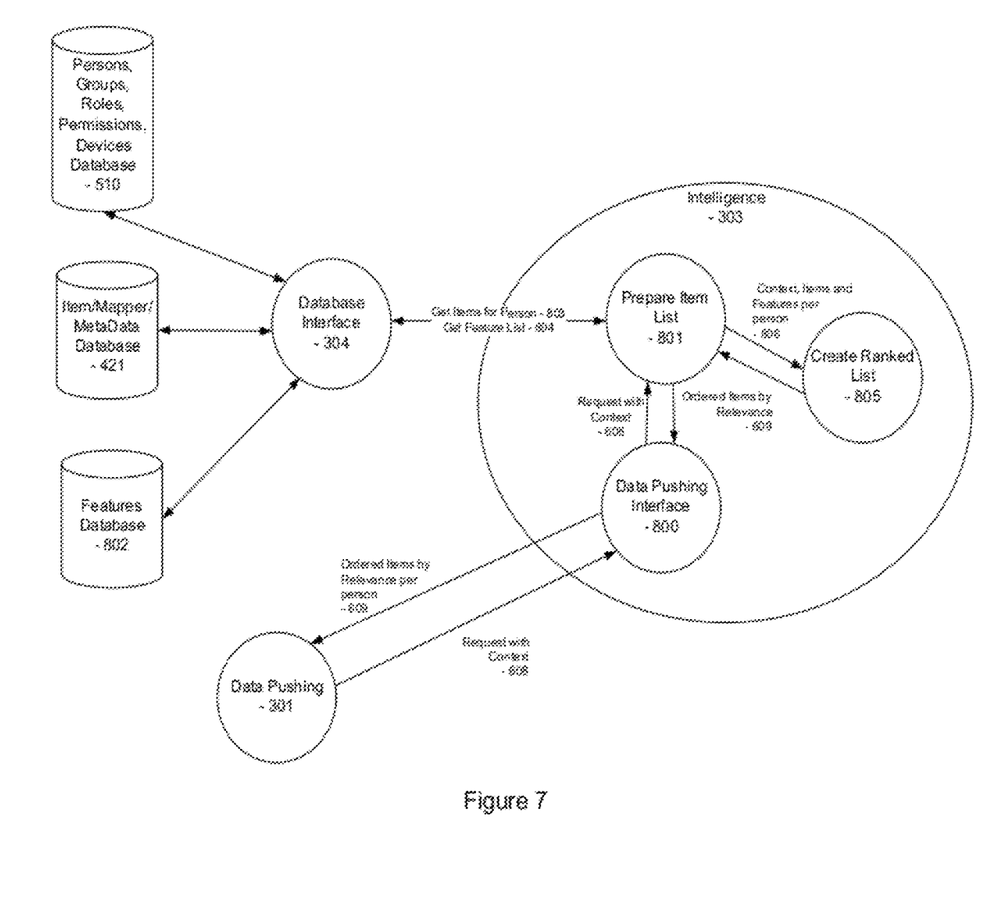
FIG. 7 is a detailed diagram of the intelligence module.
Figure 8:
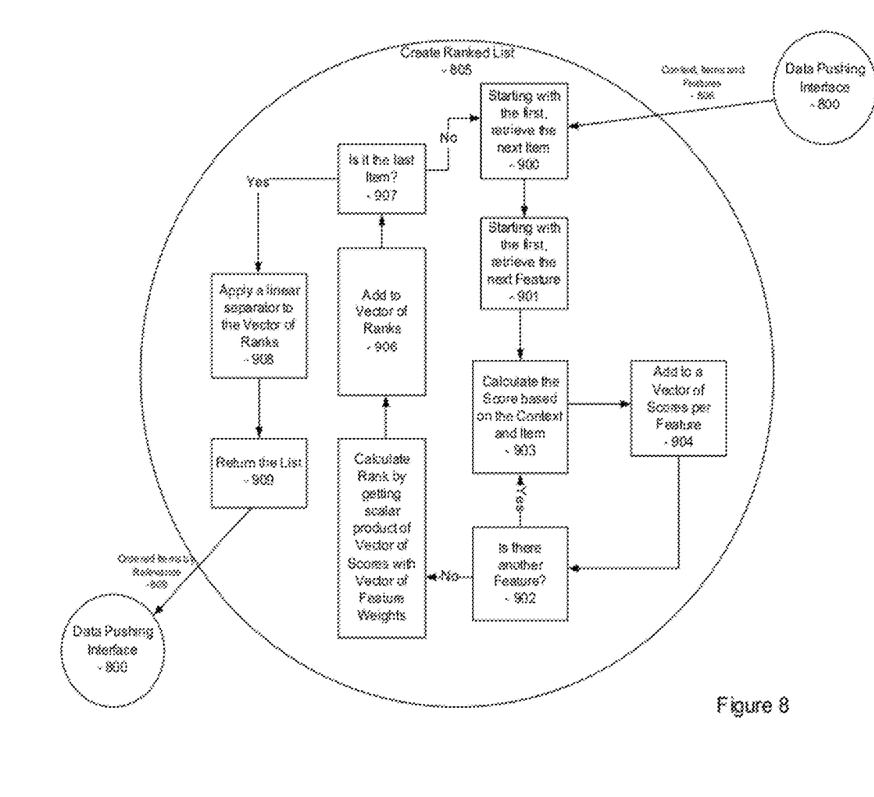
FIG. 8 shows a detailed diagram of the create rank list module.

FIG. 7 shows how the Intelligence software 303 creates the list of Ordered Items by Relevance 609 for a Person in a Role 309. The Data Pushing Interface 800 receives the Request with Context 608 from the Data Pushing software 608. It then passes this request to the Prepare Item List software 801. This is responsible for using the Context to retrieve all the Items a Person has access to based on Permissions assigned. It uses the Create Ranked List 805 to prepare an ordered list of Items by Relevance per Person 609 for the Person. It uses the Database Interface 304 to Get Items for Person 803, which uses the Person, Role and Group (part of Context) to get the Items permitted to be seen. It uses the Item/Mapper/MetaData Database 421 and Permissions Database 510 to do this. It then does a Get Feature List 804 to retrieve the features to be used to rank Items relative to Person from the Features Database 802. Features are used to calculate how relevant something is. They are built into the system, and may be different depending on the type of system. Distance is an example of a feature. The closer the Person is to something, the more relevant it is. Another example is the more the Person has in common with an Item the more relevant it is, for example if the Person is geographically in a particular Zone and the Item is associated with a Zone (MetaData), then it is more relevant. Time is another example; if an Item is important from 1-4 am, and an officer is on shift then, it will be more relevant. Another example is if an Item is associated with the Guns and Gangs Unit and an Officer is also associated with that Unit, then it is more relevant, because Item and Person both share Guns and Gangs MetaData. Once the list of Items and Features is retrieved, the Create Ranked List 805 is sent them 806. (FIG. 8 shows how the Create Ranked List 805 software works). An Ordered Items list by Relevance 609 for that person is sent back, and it then passes the list to the Data Pushing Interface 800, which in turn passes it back to the Data Pushing software 301.

FIG. 8 shows the algorithm that is gone executed to create the Ordered Items by Relevance 609. This algorithm goes through all the Items on the list and all the Features for each Item. An Item is retrieved 900. Then a Feature is retrieved 901. For each feature a Score is calculated based on the Context and Item 903. An example of this is as follows, if the Feature was Distance, it would have a finite set of definitions, like for example 5=0 to 1 km, 4=1 to 2 km, etc. This number provides the Score 903 within the Feature. For every item a vector $s=<s_1, s_2, \ldots, s_n>$ of all scores for each feature is created, where $s_n$ is the calculated score of the item for feature n 904.

The rank of an item then is calculated at 905 as the scalar product (dot product) of s with a vector of feature weights $w=<w_1, w_2, \ldots, w_n>$ where $w_n$ is the weight of the feature n. $rank=s.w=\Sigma_{i=1}^{n} s_i w_i = s_2 w_2 + \ldots + s_n w_n$ By repeating the process for each item e get a Vector of Rank $r=<r1, \ldots, r_k>$ for k items 906, where $r_k$ is the rank of the $k^{th}$ item.

Figure 9:
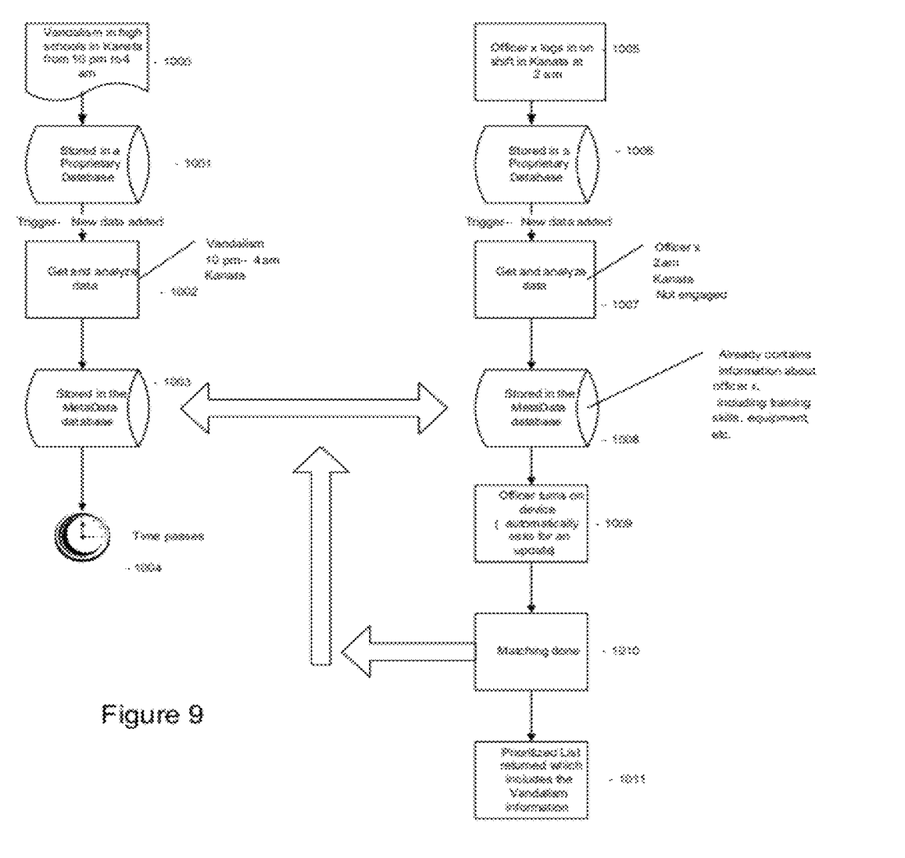
FIG. 9 is a flow chart illustrating the operation of one embodiment of the invention.

We then apply a linear separation (well-known mathematical function) 908 to the Vector of Ranks, which is effectively choosing items with rank more than a constant c used to determine the quality of the relevance. i.e. all items ranked above 10 are considered relevant to the provided user and can be shown to the user by the order of highest rank first, FIG. 9 is a flow chart showing a specific instance of an Officer receiving a prioritized list for a specific instance in time based on their location. A piece of Raw Data "Vandalism in high schools in Kanata from 10 pm to 4 am" 1000 is stored in a Proprietary Database 1001. This causes a Trigger (see FIG. 4, 420), Data Gathering 300 then gets and analyzes the data 1002. The Data is converted and an item is created mapped to particular MetaData (Vandalism, 10 pm-4 am, Kanata). It is then stored 1003 in the Item/Mapper/MetaData Database 421. Time passes 1004, until Officer x logs on shift in Kanata at 2 am 1005. This fact is stored in a proprietary database 1006. Again this causes a Trigger (see FIG. 4, 420). Data Gathering 300 then gets and analyzes the data 1007. Officer x's new context is then created and MetaData is associated (Officer x: 2 am, Kanata, Not Engaged). It is then stored 1008 in the Item/Mapper/MetaData Database 421. The officer then turns on their device 1009, which automatically asks for an update (See FIG. 6, 605). The matching is done (per FIGS. 6,7,8) and the officer receives a Prioritized List, Ω which includes the Vandalism information 1011.

It will be seen that the system thus provides the user with up-to-date prioritized information that takes account of his current contextual situation.

Information is presented to the user (in this case police officer) in the most effective way. A prioritized inbox is used that contains only the most relevant information for that particular officer at that particular time. As the officers situation changes, the prioritized inbox is updated with the different information to reflect the changing circumstances.

The system can also be designed to allow officers to input relevant information from the field in real time. They can also tag the information as being relevant to a subset of officers, for example, officers in the same geographic area.

The invention claimed is:

1. A computer-implemented method of providing a user with contextually relevant data, comprising:
storing within a database a plurality of metadata tags, each metadata tag associated with a data item of a plurality of data items stored within a data source of a plurality of data sources and summarizing the data item in a searchable form according to a common format;
establishing contextual data relating to the context of the user;
establishing relevant data items for the user, each relevant data item selected from the plurality of data items based upon applying a stored predetermined set of rules established in dependence upon at least a first predetermined portion of the contextual data to the plurality of data items, wherein
applying the stored predetermined set of rules established in dependence upon at least the first predetermined portion of the contextual data to the plurality of data items comprises:
retrieving a plurality of features; each feature associated with a context within the first predetermined portion of the contextual data and comprising a rule for associating a score;
retrieving a plurality of weights, each weight associated with a feature of the plurality of features;
generating for each data item the plurality of scores associated with the plurality of features; and
generating for each data item a total score based upon applying a predetermined mathematical process to the plurality of scores and plurality of weights;
establishing relevant content receiving devices associated with the user in dependence upon at least a second predetermined portion of the contextual data; and
making a determination based upon at least a third predetermined portion of the contextual data whether to push the established relevant data items to the user, wherein upon a positive determination generating predetermined subsets of the established relevant data items, each predetermined subset associated with a relevant content receiving device of the established relevant content receiving devices and configured to be pushed to the relevant content receiving device of the established relevant content receiving devices; and
upon a negative determination storing the established relevant data items for subsequent transmission to the user in dependence upon receipt of an indication from the user of ability to consume the established relevant data items.

2. A computer-implemented method according to claim 1, wherein
in real time the method:
stores the plurality of metadata tags within the database;
stores the data items within the data source of a plurality of data sources;
summarizes the data items in a searchable form according to a common format; and
establishes the relevant data items for the user.

3. computer-implemented method according to claim 1, wherein
the user is assigned a role; and
the stored predetermined set of rules established in dependence upon at least a first predetermined portion of the contextual data is modified in dependence upon the role assigned to the user.

4. A computer-implemented method according to claim 1, wherein
the contextual data includes at least one of a current task of the user, a qualification of the user, an area of responsibility, and a subscription to a channel by the user wherein the channel contains relevant data items relating to a topic unassociated with a current task of the user.

5. A computer-implemented method according to claim 1, wherein the method establishes a prioritized inbox for the user that contains only the currently determined relevant data items for the user.

6. A computer-implemented method according to claim 1, wherein
in real time the method updates the contextual data relating to the context of the user and makes the determinations whether to push the established relevant data items to the user.

7. A computer-implemented method according to claim 1, wherein
the user is a member of an organization having comprising a plurality of units and a set of ranks; and
the contextual data of the user includes at least one of a unit of the plurality of units to which the user is associated, a rank of the set of ranks associated with the user, a level of training of the user, and a current task associated with the user by the organization.

8. A computer-implemented method according to claim 1, wherein
the data item of a plurality of data items stored within a data source of a plurality of data sources is generated in real time by another user.

9. A computer-implemented method according to claim 1, wherein
at least one of:
a nature and a type of the metatags associated with each data item of a plurality of data items is a configurable parameter of the system; and
the metatag of the plurality of metatags associated with a data item of the plurality of data items was established in real time by another user.

10. A computer-implemented method according to claim 1, wherein
an established relevant data item provided to the user as a result of a push or receipt of an indication to consume includes an indication to be provided to the user to indicate that the established relevant data item is an updated data item previously provided to the user.

11. A computer-implemented method according to claim 1, wherein
applying a stored predetermined set of rules established in dependence upon at least a first predetermined portion of the contextual data to the plurality of data items comprises creating a vector of scores per feature, and computing a scalar product of the vector of scores with a vector of weights associated with each feature.

12. A computer-implemented method according to claim 1, further comprising:
acquiring and storing audit data, the audit data relating to at least one of:
which data items were sent to the user;
when data items became available to the user;
when data items were accessed by the user; and
when a metadata tag was associated with a data item.

13. A computer-implemented method according to claim 1, wherein
an established relevant data item provided to the user as a result of a push or receipt of an indication are provided to the user overlaid over additional information, wherein the additional information is at least one of a template and a map and the established relevant data item is displayed according to the additional information.

14. A computer-implemented method according to claim 1, further comprising
ranking the established relevant data items; and
ranking the data items pushed to the relevant receiving devices in order of interest.

15. A computer-implemented method according to claim 1, further comprising:
receiving feedback from the user with respect to a relevant data item of the established relevant data items; and
at least one of applying and modifying a ranking process applied to the established relevant data items in dependence upon the user feedback.

16. A computer-implemented method of providing a user with contextually relevant data, comprising:
storing within a database a plurality of metadata tags, each metadata tag associated with a data item of a plurality of data items stored within a data source of a plurality of data sources and summarizing the data item in a searchable form according to a common format;
receiving from the user an indication relating to receiving relevant data items;
establishing contextual data relating to the context of the user;
establishing the relevant data items for the user, each relevant data item selected from the plurality of data items based upon applying a stored predetermined set of rules established in dependence upon at least a first predetermined portion of the contextual data to the plurality of data items, wherein;
applying the stored predetermined set of rules established in dependence upon at least the first predetermined portion of the contextual data to the plurality of data items comprises:
retrieving a plurality of features; each feature associated with a context within the first predetermined portion of the contextual data and comprising a rule for associating a score;
retrieving a plurality of weights, each weight associated with a feature of the plurality of features;
generating for each data item the plurality of scores associated with the plurality of features; and
generating for each data item a total score based upon applying a predetermined mathematical process to the plurality of scores and plurality of weights;
establishing relevant content receiving devices associated with the user in dependence upon at least a second predetermined portion of the contextual data; and
generating predetermined subsets of the established relevant data items, each predetermined subset associated with a relevant content receiving device of the established relevant content receiving devices and configured to be pushed to the relevant content receiving device of the established relevant content receiving devices.

17. A system for providing a user with contextually relevant data, comprising:
a database for storing a database a plurality of metadata tags, each metadata tag associated with a data item of a plurality of data items stored within a data source of a plurality of data sources and summarizing the data item in a searchable form according to a common format;
a first software module in execution upon a microprocessor for establishing contextual data relating to the context of the user;
a second software module for establishing relevant data items for the user, each relevant data item selected from the plurality of data items based upon applying a stored predetermined set of rules established in dependence upon at least a first predetermined portion of the contextual data to the plurality of data items;

a third software module for establishing relevant content receiving devices associated with the user in dependence upon at least a second predetermined portion of the contextual data;

a fourth software module for making a determination based upon at least a third predetermined portion of the contextual data whether to push the established relevant data items to the user, wherein upon a positive determination generating predetermined subsets of the established relevant data items, each predetermined subset associated with a relevant content receiving device of the established relevant content receiving devices and configured to be pushed to the relevant content receiving device of the established relevant content receiving devices; and upon a negative determination storing the established relevant data items for subsequent transmission to the user in dependence upon receipt of an indication from the user of ability to consume the established relevant data items; and a fifth software module for:

retrieving a plurality of features; each feature associated with a context within the first predetermined portion of the contextual data and comprising a rule for associating a score;

retrieving a plurality of weights, each weight associated with a feature of the plurality of features;

generating for each data item the plurality of scores associated with the plurality of features; and generating for each data item a total score based upon applying a predetermined mathematical process to the plurality of scores and plurality of weights.

18. A system according to claim 17, wherein in real time the system:

stores the plurality of metadata tags within the database;

stores the data items within the data source of a plurality of data sources;

summarizes the data items in a searchable form according to a common format; and establishes the relevant data items for the user.

19. A system according to claim 17, wherein an established relevant data item provided to the user as a result of a push or receipt of an indication are provided to the user overlaid over additional information, wherein the additional information is at least one of a template and a map and the established relevant data item is displayed according to the additional information.

20. A system according to claim 17, wherein the system establishes a prioritized inbox for the user that contains only the currently determined relevant data items for the user.

21. A system according to claim 17, wherein in real time the system updates the contextual data relating to the context of the user and makes the determinations whether to push the established relevant data items to the user.

22. A system according to claim 17, wherein the user is a member of an organization having comprising a plurality of units and a set of ranks; and the contextual data of the user includes at least one of a unit of the plurality of units to which the user is associated, a rank of the set of ranks associated with the user, a level of training of the user, and a current task associated with the user by the organization.

23. A system according to claim 17, wherein the data item of a plurality of data items stored within a data source of a plurality of data sources is generated in real time by another user.

24. A system according to claim 17, wherein in real time the system updates the contextual data relating to the context of the user and makes the determinations whether to push the established relevant data items to the user.

25. A system according to claim 17, wherein an established relevant data item provided to the user as a result of a push or receipt of an indication to consume includes an indication to be provided to the user to indicate that the established relevant data item is an updated data item previously provided to the user.

26. A system according to claim 17, wherein applying a stored predetermined set of rules established in dependence upon at least a first predetermined portion of the contextual data to the plurality of data items comprises creating a vector of scores per feature, and computing a scalar product of the vector of scores with a vector of weights associated with each feature.

* * * * *